United States Patent
Kong et al.

(10) Patent No.: US 8,331,421 B2
(45) Date of Patent: Dec. 11, 2012

(54) METHOD AND SYSTEM FOR A DELAY-LOCKED LOOP FOR CLOSELY SPACED MULTIPATH

(75) Inventors: Hongwei Kong, Denville, NJ (US); Karthik Rajagopalan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 746 days.

(21) Appl. No.: 12/543,283

(22) Filed: Aug. 18, 2009

(65) Prior Publication Data

US 2011/0043386 A1    Feb. 24, 2011

(51) Int. Cl.
*H04B 1/00* (2006.01)
(52) U.S. Cl. .......... 375/148; 375/144; 375/147
(58) Field of Classification Search ........ 341/24; 375/144, 147, 148
See application file for complete search history.

(56) References Cited

U.S. PATENT DOCUMENTS

| | | | |
|---|---|---|---|
| 6,748,009 B2 * | 6/2004 | Reznik et al. ........ | 375/147 |
| 7,012,952 B2 * | 3/2006 | Jayaraman et al. ........ | 375/148 |
| 7,054,351 B1 * | 5/2006 | Braam et al. ........ | 375/144 |
| 7,133,434 B1 * | 11/2006 | Toskala et al. ........ | 375/148 |
| 2003/0026326 A1 * | 2/2003 | Jayaraman et al. ........ | 375/148 |
| 2007/0218934 A1 * | 9/2007 | Osaki ........ | 455/522 |
| 2008/0049816 A1 * | 2/2008 | Nakajima ........ | 375/148 |
| 2009/0268787 A1 * | 10/2009 | Cairns et al. ........ | 375/148 |

* cited by examiner

*Primary Examiner* — Khai M Nguyen
(74) *Attorney, Agent, or Firm* — Sterne, Kessler, Goldstein & Fox P.L.L.C.

(57) ABSTRACT

Aspects of a method and system for a delay-locked loop for closely spaced multipath may include determining a difference signal computed from one or more early energies and one or more late energies associated with one or more channel taps selected from a plurality of channel taps. A fat finger timing may be adjusted based on the difference signal, the fat finger comprising the plurality of channel taps that are spaced contiguously at chip period intervals. The one or more early energies and the one or more late energies may be determined based on an offset of $Tc/2$ or $3Tc/8$, where $Tc$ denotes the chip period interval. The offset may be measured from an energy peak associated with a multipath component that may be associated with the fat finger.

20 Claims, 7 Drawing Sheets

METHOD AND SYSTEM FOR A DELAY-LOCKED LOOP FOR CLOSELY SPACED MULTIPATH

CROSS-REFERENCE TO RELATED APPLICATIONS/INCORPORATION BY REFERENCE

None.

FIELD OF THE INVENTION

Certain embodiments of the invention relate to signal processing for communication systems. More specifically, certain embodiments of the invention relate to a method and system for a delay-locked loop for closely spaced multipath.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next, step in the mobile communication revolution. The mobile Internet is poised to become a common source of everyday information, and easy, versatile mobile access to this data will be taken for granted.

Third generation (3G) and fourth generation (4G) cellular networks are specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communications data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a delay-locked loop for closely spaced multipath, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a delay-locked loop for closely spaced multipath. Aspects of the method and system for a delay-locked loop for closely spaced multipath may comprise determining a difference signal computed from one or more early energies and one or more late energies associated with one or more channel taps selected from a plurality of channel taps. A fat finger timing may be adjusted based on the difference signal, and the fat finger comprises the plurality of channel taps that are spaced contiguously at chip period intervals.

The one or more early energies and the one or more late energies may be determined based on an offset of $Tc/2$ or $3Tc/8$, where $Tc$ denotes the chip period interval. The offset may be measured from an energy peak associated with a multipath component that may be associated with the fat finger. Adjusting of the fat finger timing may be triggered by accumulating the difference signal, and comparing the accumulated difference signal to one or more thresholds. The fat finger timing may be adjusted by adjusting timing of the plurality of channel taps, where the channel taps remain spaced contiguously at chip period intervals. The fat finger timing may be adjusted adaptively. The difference signal may be determined by subtracting the one or more late energies from the one or more early energies. One or more path processing blocks may be computing the early energies and the late energies, wherein the one or more path processing blocks are operable to exploit transmit diversity. The communication signals may conform with a Universal Mobile Telecommunications System (UMTS) signal.

Figure 1A:
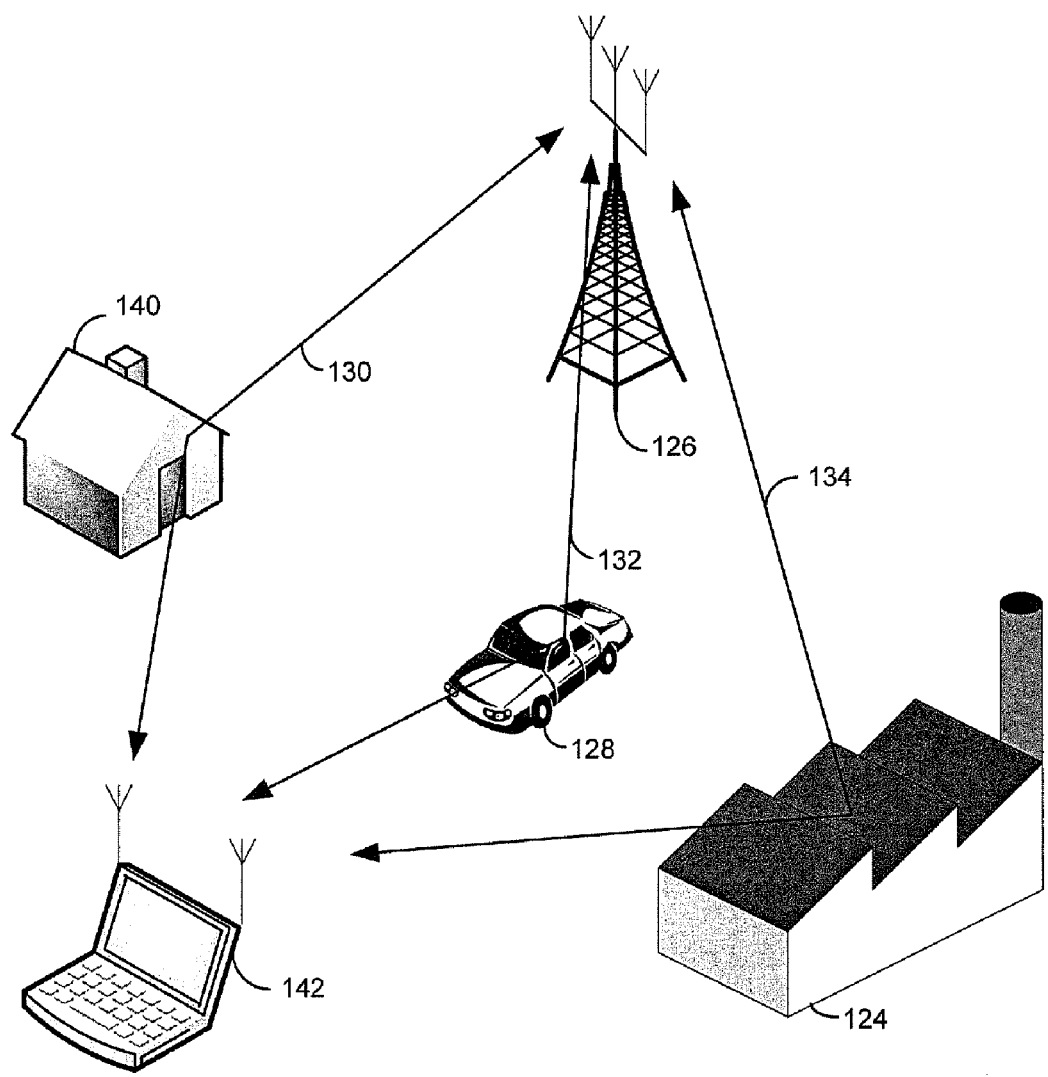
FIG. 1A is a diagram illustrating exemplary cellular multipath communication between a base station and a mobile terminal, in connection with an embodiment of the invention.

FIG. 1A is a diagram illustrating exemplary cellular multipath communication between a base station and a mobile terminal, in connection with an embodiment of the invention. Referring to FIG. 1A, there is shown a building 140 such as a house or office, a mobile terminal 142, a factory 124, a base station 126, a car 128, and communication paths 130, 132 and 134.

The base station 126 and the mobile terminal 142 may comprise suitable logic, circuitry, interfaces and/or code that may be enabled to generate and process (multiple input multiple output) MIMO communication signals.

Wireless communications between the base station 126 and the mobile terminal 142 may take place over a wireless channel. The wireless channel may comprise a plurality of communication paths, for example, the communication paths 130, 132 and 134. A wireless channel comprising a plurality of communication paths, for example communication paths 130, 132, and 134 may also be referred to as a multipath channel. The wireless channel may change dynamically as the mobile terminal 142 and/or the car 128 moves. In some cases, the mobile terminal 142 may be in line-of-sight (LOS) of the base station 126. In other instances, there may not be a direct line-of-sight between the mobile terminal 142 and the base station 126 and the radio signals may travel as reflected communication paths between the communicating entities, as illustrated by the exemplary communication paths 130, 132 and 134. The radio signals may be reflected by man-made structures like the building 140, the factory 124 or the car 128, or by natural obstacles like hills. Such a system may be referred to as a non-line-of-sight (NLOS) communications system.

Signals communicated by the communication system may comprise both LOS and NLOS signal components. If a LOS signal component is present, it may be much stronger than NLOS signal components. In some communication systems, the NLOS signal components may create interference and reduce the receiver's performance. This may be referred to as multipath interference. The communication paths 130, 132 and 134, for example, may arrive with different delays at the mobile terminal 142. The communication paths 130, 132 and 134 may also be differently attenuated. In the downlink, for example, the received signal at the mobile terminal 142 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 142, in particular for NLOS communication systems.

The better the wireless channel is known, and thus also the characteristics of the multipath components, for example multipath components 130, 132, and 134, the higher the performance gains that may be achieved at the receiver. However, the channel may not be known perfectly in practice, leading to so-called imperfect channel state information. Imperfect channel state information is due to many factors that may be related to the channel characteristics, and the receiver characteristics, so that channel state information typically may be an approximation to the real channel. Sometimes, multipath components may arrive at a receiver so closely spaced in time that a receiver may not be able to resolve individual paths and may only be able to see a collection of multipath signals as a "fat finger," which may extend over one or more chip period. In this case, in accordance with various embodiments of the invention, it may be advantageous to represent such a fat finger by a plurality of channel taps which may model a fat finger through a plurality of fingers/paths spaced at chip-time intervals.

Figure 1B:
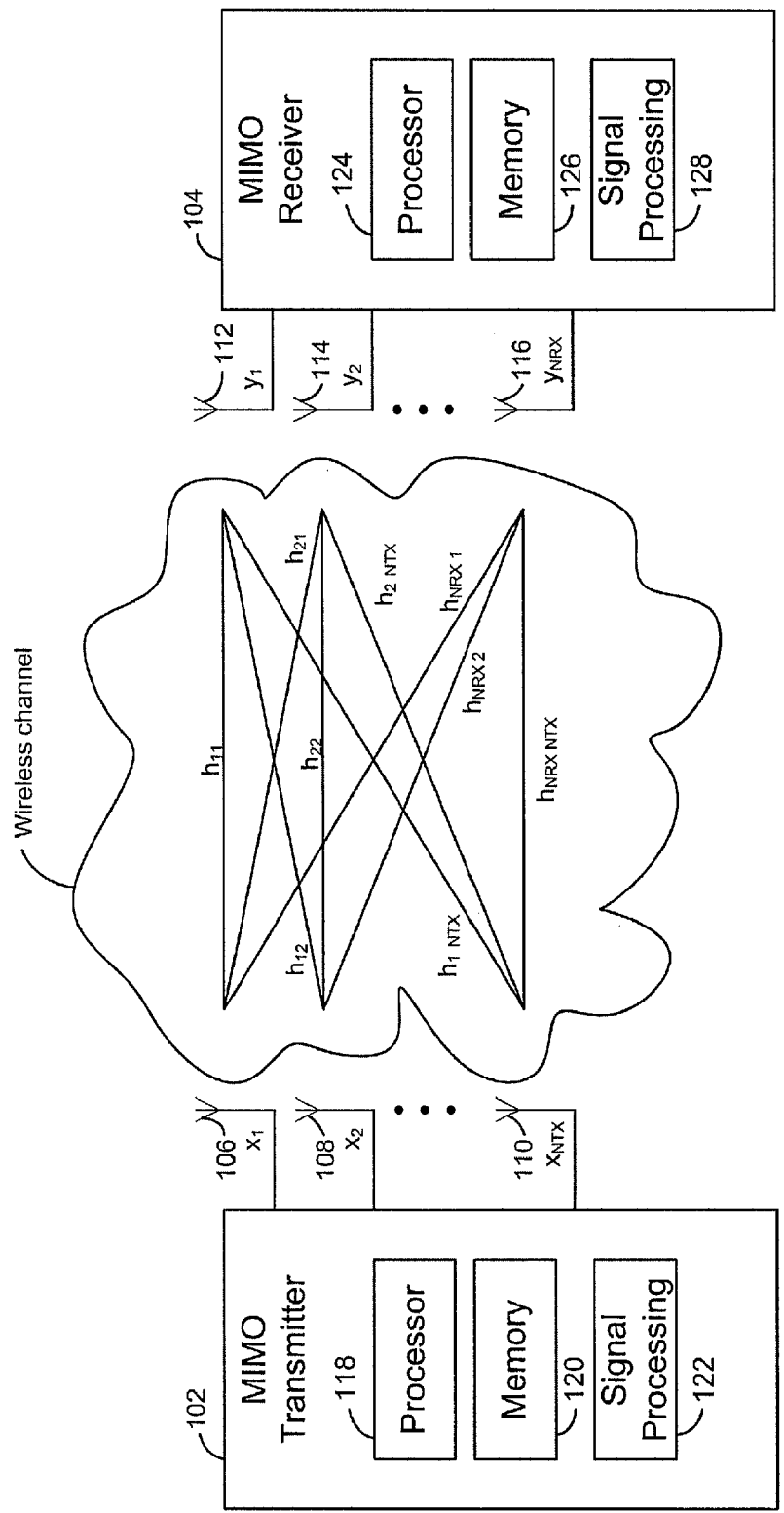
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. The MIMO transmitter 102 may comprise a processor block 118, a memory block 120, and a signal processing block 122. The MIMO receiver 104 may comprise a processor block 124, a memory block 126, and a signal processing block 128. There is also shown a wireless channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry, interfaces and/or code that may be enabled to generate transmit symbols $x_i$ $i \in \{1, 2, \ldots N_{TX}\}$ that may be transmitted by the transmit antennas, of which the antennas 106, 108 and 110 may be depicted in FIG. 1B. The processor block 118 may comprise suitable logic, circuitry, interfaces, and/or code that may be enabled to process signals. The memory block 120 may comprise suitable logic, circuitry, interfaces, and/or code that may be enabled to store and/or retrieve information for processing in the MIMO transmitter 102. The signal processing block 122 may comprise suitable logic, circuitry, interfaces and/or code that may be enabled to process signals, for example in accordance with one or more MIMO transmission protocols. The MIMO receiver 104 may comprise suitable logic, circuitry, interfaces and/or code that may be enabled to process the receive symbols $y_i$ $i \in \{1, 2, \ldots N_{RX}\}$ that may be received by the receive antennas, of which the antennas 112, 114 and 116 may be shown in FIG. 1B. The processor block 124 may comprise suitable logic, circuitry, interfaces, and/or code that may be enabled to process signals. The memory block 126 may comprise suitable logic, circuitry, interfaces, and/or code that may be enabled to store and/or retrieve information for processing in the MIMO receiver 104. The signal processing block 128 may comprise suitable logic, circuitry, interfaces and/or code that may be enabled to process signals, for example in accordance with one or more MIMO protocols. An input-output relationship between the transmitted and the received signal in a MIMO system may be written as:

$$y = Hx + n$$

where $y = [y_1, y_2, \ldots y_{NRX}]^T$ may be a column vector with $N_{RX}$ elements, $.^T$ may denote a vector transpose, $H = [h_{ij}]$: $i \in \{1, 2, \ldots N_{RX}\}$; $j \in \{1, 2, \ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements.

The system diagram in FIG. 1B may illustrate an exemplary multi-antenna system as it may be utilized in a Universal Mobile Telecommunications System (UMTS). Over each of the $N_{TX}$ transmit antennas, a symbol stream, for example $x_1(t)$ over antenna 106, may be transmitted. A wireless channel $h_{12}$ from transmit antenna 108 to receive antenna 112, as illustrated in the figure, may be multi-dimensional. In particular, the wireless channel $h_{12}$ may comprise a temporal impulse response, comprising one or more multipath components, for example multipath components 130, 132, and 134 as illustrated in FIG. 1A. The wireless channels as illustrated in FIG. 1B depict a spatial dimension of the wireless channel because the transmitted signal from each transmit antenna may be received differently at each receiver antenna. Thus, a channel impulse response may be measured and/or estimated for each sub-carrier. In accordance with various embodiments of the invention, a suitable communication system may employ, for example, transmit diversity and/or more general multiple input, multiple output system.

Figure 2:
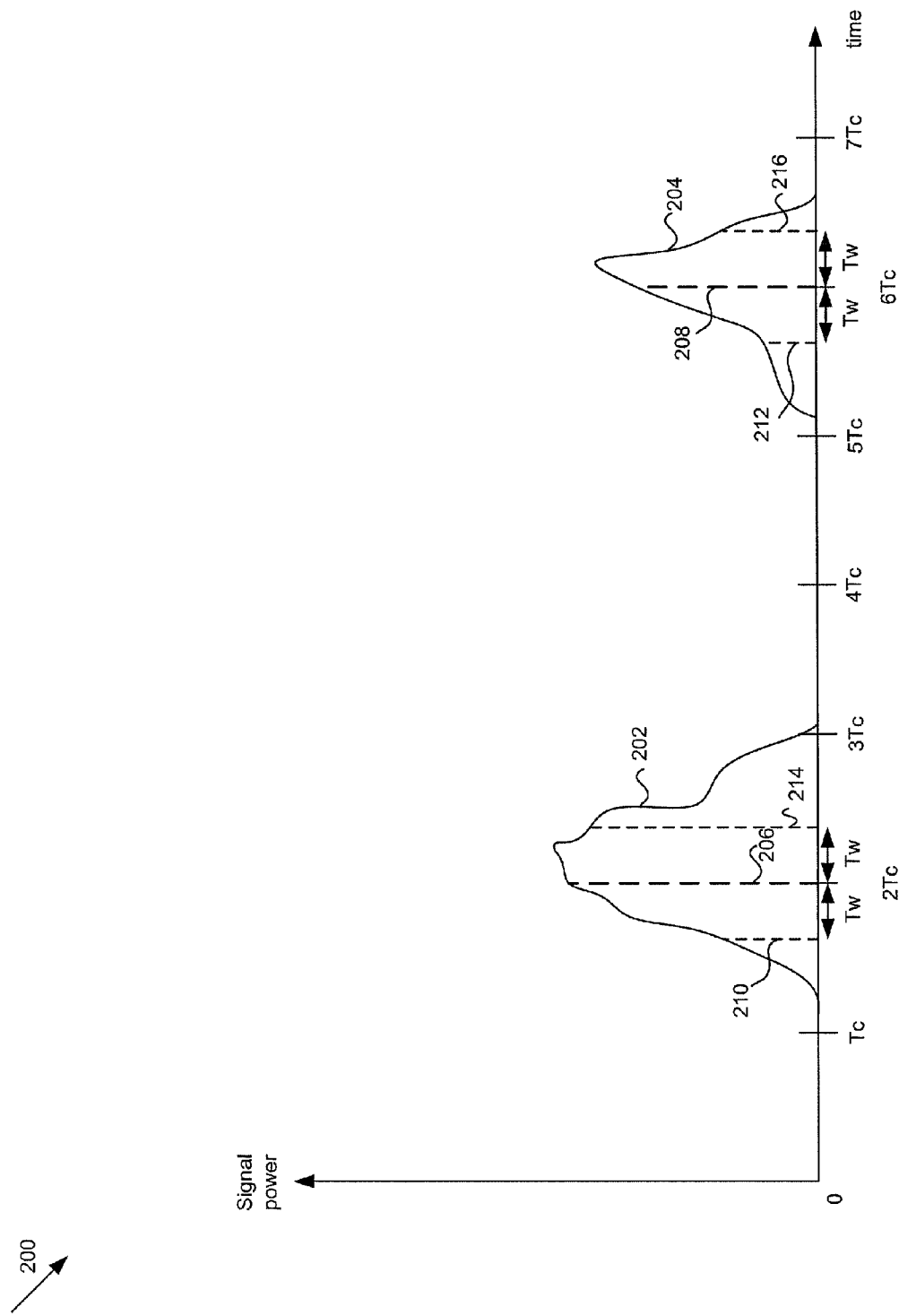
FIG. 2 is a diagram illustrating an exemplary wireless channel 200, in accordance with an embodiment of the invention.

FIG. 2 is a diagram illustrating an exemplary wireless channel 200, in accordance with an embodiment of the invention. Referring to FIG. 2, there is shown a wireless channel 200, comprising a first path signal energy 202, a second path signal energy 204, a first path channel tap 206, and a second path channel tap 208. There is a first path early sample energy 210, a first path late sample energy 214, a second path early sample energy 212, and a second path late sample energy 216. There is further shown a horizontal time axis, a vertical signal power axis, and time instants 0, Tc, 2Tc, 3Tc, 4Tc, 5Tc, 6Tc, and 7Tc. Tc may denote an arbitrary time period. In some instances, Tc may be referred to as the chip period. The illustrated time period Tw may indicate an arbitrary offset time period Tw<Tc, from the channel tap the early sample and the late sample may be associated with. In accordance with an exemplary embodiment of the invention, Tw may be Tc/4, or 3Tc/8, for example.

In accordance with various embodiments of the invention, a wireless channel 200 may comprise multiple communication paths, for example communication paths 130, 132, and/or 134, as illustrated in FIG. 1A. Because signals along different communication paths arrive at different time instants at a receiver, a wireless channel may be illustrated by a signal power versus time diagram, as shown in FIG. 2. An exemplary first signal path energy 202 may represent a first signal path, and an exemplary second signal path energy 204 may represent a second signal path.

At a receiver, for example at the base station 126 and/or at the mobile terminal 142, a receiver may estimate the channel for purposes of decoding the received signal, for example. In accordance with various embodiments of the invention, a received first path signal energy 202 may be modeled by a first path channel tap 206 at delay 2Tc, and a second path signal energy 204 may be modeled by a second path channel tap 208. Since modern communication systems may operate in discrete time, and to keep signal processing complexity as low as possible, the path channel taps 206 and 208, may be restricted to be selected at chip period intervals for example. Thus, the first path channel tap 206 may be selected to be at 2Tc, and the second path channel tap 208 may be selected to be at 6Tc, as illustrated in FIG. 2. The channel taps may also be referred to as fingers, in particular in the context of RAKE receiver structures.

In order to maintain the information about the wireless channel 200 current, and thus accurate enough for signal processing, it may be advantageous to track the channel variations over time, specifically the power and the location in time of the multipath components. In accordance with various embodiments of the invention, the channel taps 206 and 208 may be selected as illustrated in FIG. 3

Figure 3:
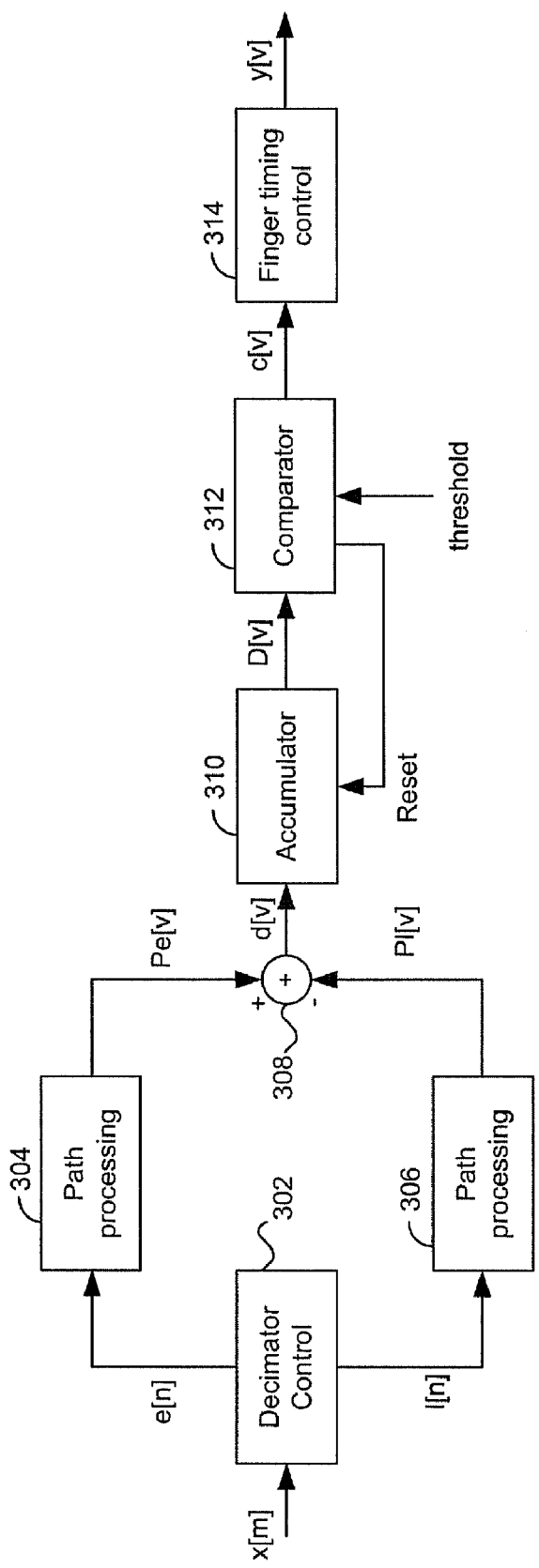
FIG. 3 illustrates an exemplary delay-locked loop for a communication path, in accordance with various embodiments of the invention.

FIG. 3 illustrates an exemplary delay-locked loop for a communication path, in accordance with various embodiments of the invention. Referring to FIG. 3, there is shown a decimator control block 302, path processing blocks 304 and 306, an adder 308, an accumulator 310, a comparator 312, and a finger timing control 314. There is also shown an input signal x[m], an early sample signal e[n], a late sample signal I[n], an early sample energy signal Pe[v], a late sample energy signal PI[v], a difference signal d[v], an accumulated difference signal D[v], a comparator output signal c[v], a threshold signal, and a finger timing control signal y[v].

The decimator control block 302 may comprise suitable logic, circuitry, interfaces and/or code that are operable to downconvert an input signal from a higher sampling rate to an output signal at a lower sampling rate. The path processing blocks 304 and 306 may comprise suitable logic, circuitry, interfaces and/or code that are operable to decode an input signal and compute its signal power in the code domain. The decoding operation may comprise, but is not limited to, removal of the scrambling code and/or OVSF code, accumulation, and energy determination of a decoded input signal. In some cases, path processing blocks 304 and 306 may comprise a plurality of decoding chains in parallel, for example with transmit diversity wireless systems.

The adder 308 may comprise suitable logic, circuitry, interfaces and/or code that are operable to generate an output signal that is proportional to a sum or difference of its input signals. The accumulator 310 may comprise suitable logic, circuitry, interfaces and/or code that are operable to generate an output signal that is the sum of its input signal, taken at certain times, and accumulated over a certain time interval. The accumulator 310 may be reset, for example by the comparator 312. The comparator 312 may comprise suitable logic, circuitry, interfaces and/or code that may be enabled to compare an input signal with a threshold input signal, and generate an output signal that may be determined by the input signal differences. The finger timing control 314 may comprise suitable logic, circuitry, interfaces and/or code that are operable to determine a suitable timing of the channel taps, for example the channel taps 206, and/or the channel taps 208, which may also be referred to as fingers.

In accordance with various embodiments of the invention, the timing of the channel taps (or "fingers"), for example channel taps 206 and 208, may be determined by processing early and late samples around the relevant channel tap. For example, consider the first path signal energy 202, as illustrated in FIG. 2. The input signal x[m] may comprise the first path signal energy 202. The input signal x[m] may typically be oversampled with respect to the chip rate Tc shown in FIG. 2. For example, in accordance with various embodiments of the invention, the input signal x[m] may be oversampled by a factor of e.g. 8. That is, there will be 8 samples of the input signal in a time interval Tc. Thus, the first path signal energy 202 may be sampled with a period of e.g. Tc/8. Based on timing offset Tw, and early sample signal 210 and a late sample signal 214 may be selected that are offset by a time period Tw from a channel tap. After selecting an appropriate early sample signal and late sample signal from input signal x[m], the decimator control block 302 downsamples the early sample signal and the late sample signal to chip rate, generating the output signals e[n] for the early samples, and I[n] for the late sample signal. The early sample signal e[n] may be communicatively coupled to the path processing block 304, where its signal energy Pe[v] may be computed. Similarly, the late sample signal I[n] may be communicatively coupled to the path processing block 306, where its signal energy PI[v] may be computed.

The adder 308 is operable to generate a difference signal d[v]=Pe[v]−PI[v], that is, the output of the adder 308 may be proportional to the difference between the early sample signal energy, and the late sample energy. This difference signal d[v] is communicatively coupled to the accumulator 310. The accumulator 310 integrates the difference signal d[v] to generate the accumulated difference signal D[v]. The integration operation that is performed by the accumulator 310 may have an averaging effect. However, when for example, the early sample signal energy Pe[v] is consistently larger than the late sample signal energy PI[v], the accumulator 310 output D[v] will be positive, and may continue to increase. This may be an indication that the multipath component measured is moving away from, for example the selected chip time channel tap 206 at 2Tc, towards Tc. Similarly, when for example, the signal path energy 202 is moving towards 3Tc, the accumulator output D[v] may continue to decrease. In the comparator 312, the accumulator output D[v] may be compared with one or more threshold values. For example, when D[v] is greater than some threshold, the timing of the channel tap (finger) 206 may be newly determined, and may be set to Tc or an arbitrary portion of Tc (from 2Tc). Also, as the accumulator output D[v] triggers a channel tap re-adjustment action, the accumulator 310 may be reset. The output signal c[v] from the comparator 312 may be communicatively coupled to the finger timing control 314, which may readjust the channel tap timings.

Figure 4:
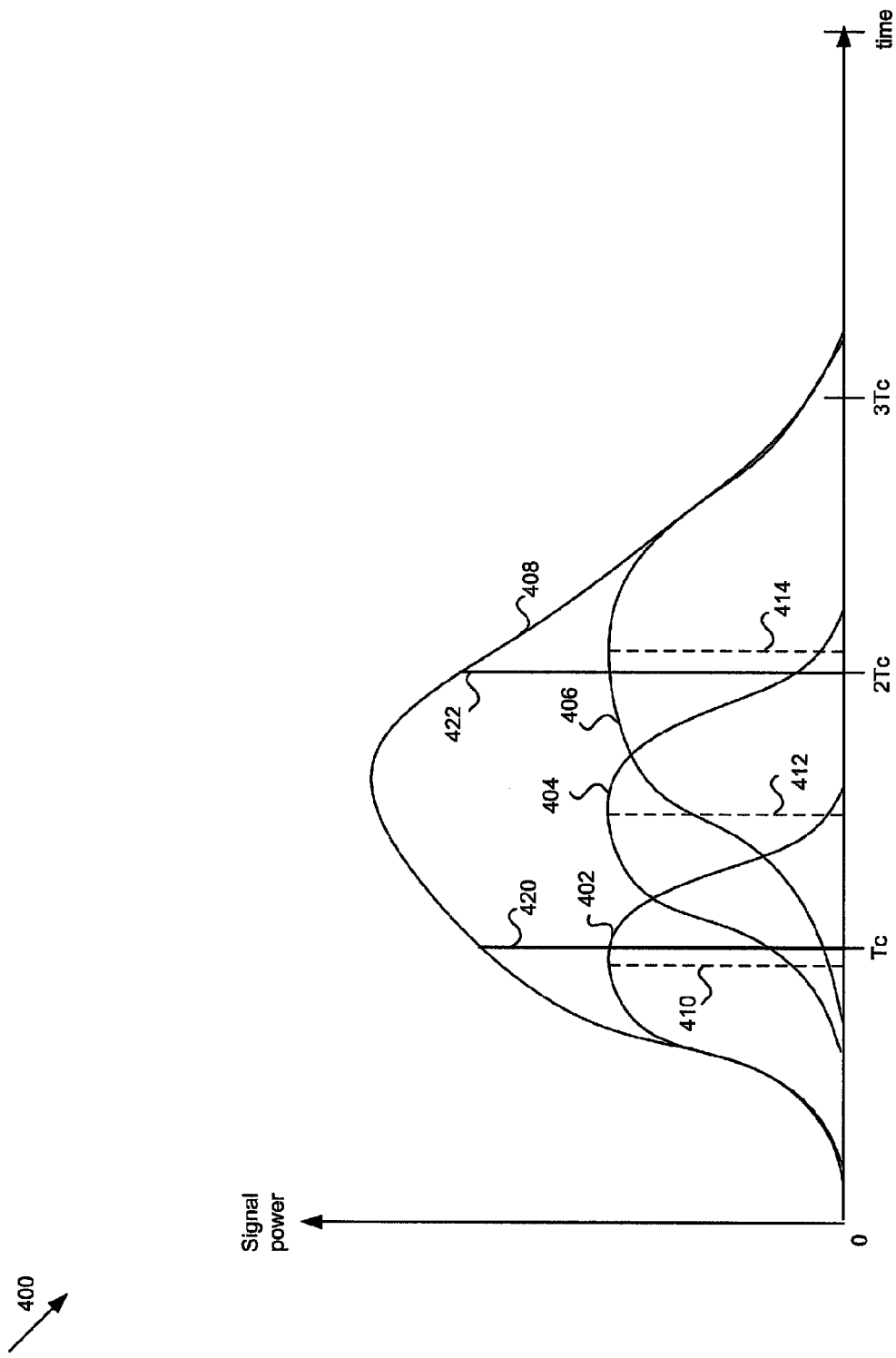
FIG. 4 illustrates an exemplary wireless channel, in accordance with various embodiments of the invention.

FIG. 4 illustrates an exemplary wireless channel, in accordance with various embodiments of the invention. Referring to FIG. 4, there is shown a wireless channel illustration 400, comprising a received signal level 408. The received signal level 408 may be a sum of a first path signal level 402, a second path signal level 404, and a third path signal level 406. There is also shown a first path signal maximum 410, a second path signal maximum 412, and a third path signal maximum 414. There are further shown a first channel tap timing 420, and a second channel tap timing 422.

For closely spaced multipaths, for example the first path signal level 402, the second signal path level 404, and the third path signal level 406, the resulting sum of the paths may lead to a received signal level 408, where the signal peaks from individual paths may not be distinguishable at the receiver. The resolvability of the multipath may be related to the sampling rate, and chip rate of the wireless communication system. For example, the exemplary channel illustrated in FIG. 4 may only show one clear peak. In accordance with various embodiments of the invention, such non-resolvable communication paths may be assigned a so-called "fat finger," whereby a group of chip-spaced taps may be associated with a group of multipaths. For example the first channel tap timing 420, and the second channel tap timing 422 may be considered a fat finger, associated with a first path signal level 402, a second path signal level 404, and a third path signal level 406.

In accordance with various embodiments of the invention, the fingers associated with a fat finger may be chip-spaced to obtain desirable system characteristics such as uncorrelated noise sample from individual fingers in the fat finger group. The fat finger may be controlled similarly to a single tap, that is, the group of fingers, for example the first channel tap timing 420, and the second channel tap timing 422, may be adjusted together. In some cases, the adjustment may be made by designating a lead finger, and the entire group of fingers may follow the lead finger adjustments. More generally, in accordance with various embodiments of the invention, a set of fingers associated with a fat finger may be selected to be used for the delay-locked loop operation.

Figure 5:
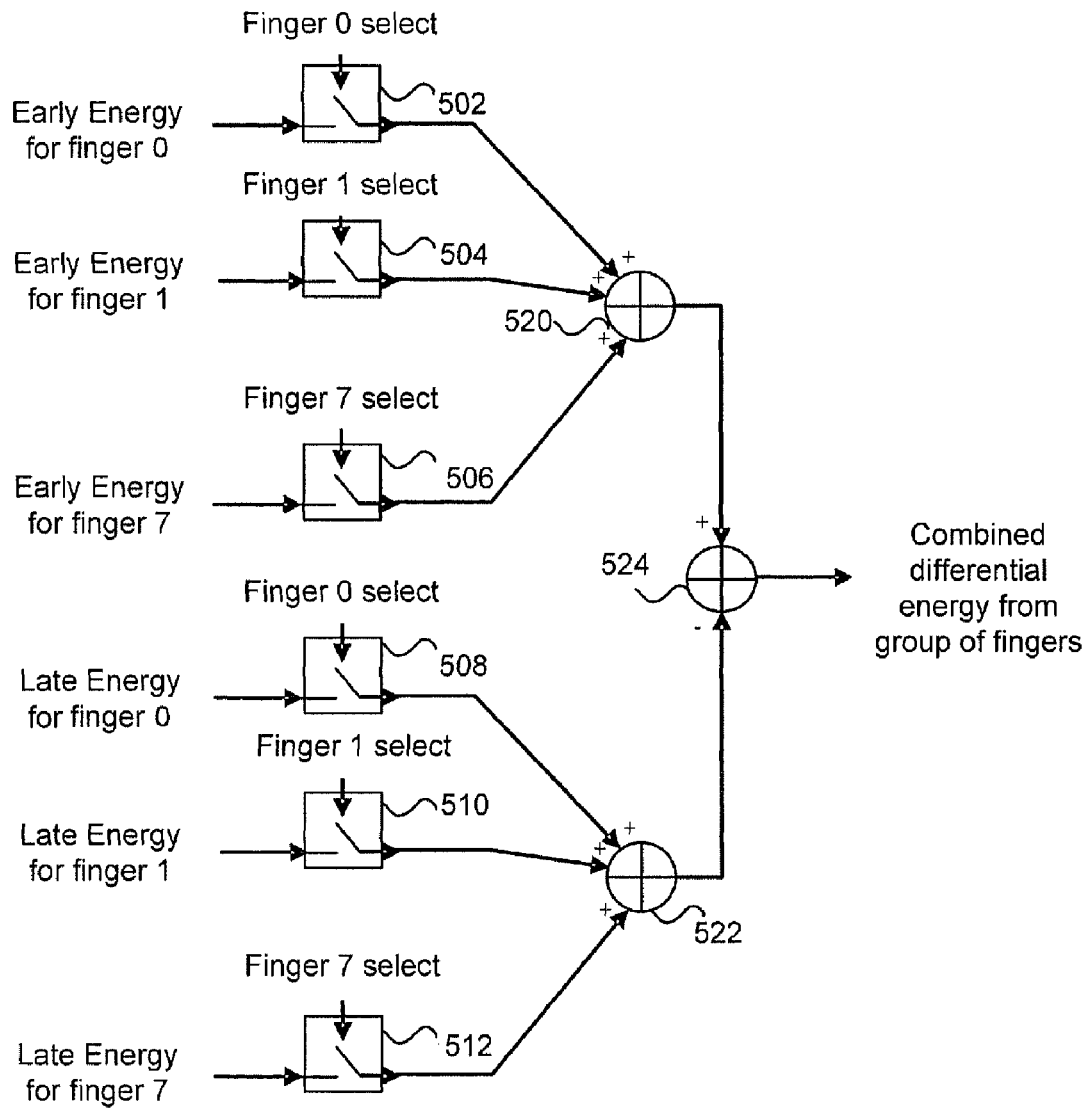
FIG. 5 illustrates an exemplary combining of finger energies associated with a fat finger, in accordance with various embodiments of the invention.

FIG. 5 illustrates an exemplary combining of finger energies associated with a fat finger, in accordance with various embodiments of the invention. Referring to FIG. 5, there is shown selector switches 502, 504, 506, 508, 510, and 512. There is further shown adders 520, 522, and 524.

As illustrated in FIG. 2 and FIG. 3, the early energy Pe[v] and the late energy Pl[v] may be determined for each multipath component, based on early samples e[n] and late samples I[n], respectively. As illustrated in FIG. 4, a group of fingers may be associated with a so-called fat finger, for example the first channel tap timing 420, and the second channel tap timing 422. In accordance with various embodiments of the invention, one or more fingers associated with a fat finger may be processed to obtain the early energy Pe[v] and the late energy Pl[v]. For example, as illustrated in FIG. 5, there may be eight paths associated to one or more fat finger. The early energy Pe[v] of a finger 0, associated for example with the first channel tap timing 420, may be communicatively coupled to the selector switch 502. Similarly, the early energies for fingers 1 through 7 may be communicatively coupled to selector switches 504 through 506, respectively. The early energies and late energies communicatively coupled to the selector switches 502 to 512 may be determined, for example, in path processing blocks similar to path processing blocks 304 or 306. As mentioned for FIG. 4, the differential energy between early energies and late energies that may be computed for purposes of the fat finger timing adjustment may be based on selected fingers associated with the fat finger. Thus, in instances when a finger is selected for this purpose, its associated selector switch may be activated. For example, when finger 0 is selected to be used, the selector switch 502 may be activated. The early energies selected via the selector switches, may be summed in the adder 520 to generate a cumulative early energy at the output of the adder 520. Similarly, the late energies from each finger may be selected via the selector switches 508 through 512, for example. The late energies selected via the selector switches may be summed in the adder 522 to generate a cumulative late energy at the output of the adder 522. The outputs of the adders 520 and 522 may be communicatively coupled to the adder 524, where the difference between the cumulative early energy and the cumulative late energy may be formed. The output of the adder 524 may then be communicatively coupled to an accumulator, similar the accumulator 310, illustrated in FIG. 3. Thus, a difference in energy between the early energies and late energies of selected channel taps associated with a fat finger may be computed for purposes of adjusting the fat finger timing, and its associated channel taps.

Figure 6:
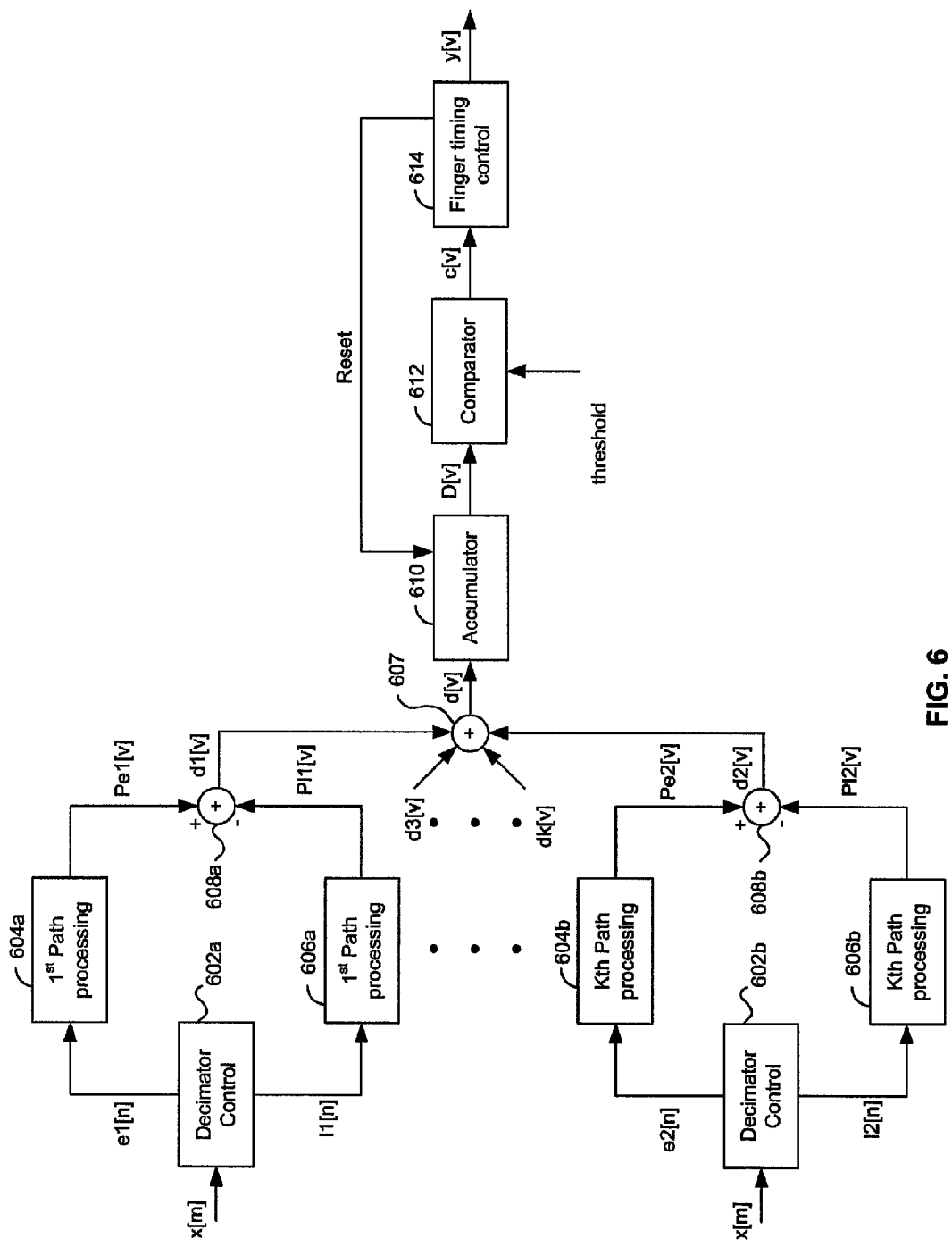
FIG. 6 illustrates an exemplary delay-locked loop for fat finger control, in accordance with various embodiments of the invention.

FIG. 6 illustrates an exemplary delay-locked loop for fat finger control, in accordance with various embodiments of the invention. Referring to FIG. 6, there is shown decimator control blocks 602a/b, path processing blocks 604a/b and 606a/b, adder 607 and 608a/b, an accumulator 610, a comparator 612, and a finger timing control 614. There is also shown an input signal x[m], early sample signals e1[n] and e2[n], late sample signals I1[n] and I2[n], early sample energy signals Pe1[v] and Pe2[v], late sample energy signals Pl1[v] and Pl2[v], difference signals d1[v], d2[v], d3[v], dk[v], and d[v], and accumulated difference signal D[v], a comparator output signal c[v], and a finger timing control signal y[v].

The decimator control blocks 602a/b may comprise suitable logic, circuitry, interfaces and/or code that are operable to downconvert an input signal from a higher sampling rate to an output signal at a lower sampling rate. The path processing blocks 604a/b and 606a/b may comprise suitable logic, circuitry, interfaces and/or code that are operable to decode an input signal and compute its signal power in the code domain. The decoding operation may comprise, but is not limited to, removal of the scrambling code and/or OVSF code, accumulation, and energy determination of a decoded input signal.

The adders 608a/b may comprise suitable logic, circuitry, interfaces and/or code that are operable to generate an output signal that is proportional to a sum or difference of its input signals. The accumulator 610 may comprise suitable logic, circuitry, interfaces and/or code that are operable to generate an output signal that is the sum of its input signal, taken at certain times, and accumulated over a certain time interval. The comparator 612 may comprise suitable logic, circuitry, interfaces and/or code that are operable to compare an input signal with a threshold input signal, and generate an output signal that may be determined by the input signal differences. The finger timing control 614 may comprise suitable logic, circuitry, interfaces and/or code that are operable to determine a suitable timing of the channel taps, for example the channel taps 420, and/or the channel taps 422, which may also be referred to as fingers.

Similar to FIG. 3, an input signal x[m] may be received at a decimator control 602a for downsampling. The early and late samples for a first multipath may be output by the decimator control 602a, and may be coupled to the path processing blocks 604a and 606a, respectively. The path processing block 604a may determine the early energy Pe1[v], and the path processing block 606a may generate the late energy Pl1[v]. At the output of adder 608a, the difference d1[v] between Pe1[v] and Pl1[v] may be computed for a first multipath. Similarly, d2[v], d3[v], . . . , d(k−1)[v], and dk[v] may be computed for one or more multipath components. The difference signals d1[v] through dk[v] selected for the delay-locked loop operation may be added in the adder 607, to generate the overall difference signal d[v]. The operation of the accumulator 610, comparator 612, and finger timing control 614 may be substantially similar to the accumulator 310, comparator 312, and finger timing control 314, which are described with respect to FIG. 3. The finger timing control 614 may be operable to reset the accumulator 510, when adjusting the timing, in accordance with various embodiments of the invention.

Determining the differential energy from one or more selected multipath component may be desirable to adjust the fat finger timing. In particular, the timing of the entire fat finger may be adjusted, to avoid that individual fingers/taps drift apart, and/or track onto another channel taps position.

In accordance with an embodiment of the invention, a method and system for a delay-locked loop for closely spaced multipath may comprise determining a difference signal computed from one or more early energies and one or more late energies associated with one or more channel taps selected from a plurality of channel taps, as illustrated in FIG. 2 and FIG. 3. A fat finger timing may be adjusted based on the difference signal, the fat finger comprising the plurality of channel taps that are spaced contiguously at chip period intervals, as illustrated in FIG. 4.

The one or more early energies and the one or more late energies may be determined based on an offset Tw of Tc/2 or 3Tc/8, where Tc denotes the chip period interval, as depicted in FIG. 2 and FIG. 4, for example. The offset Tw may be measured from an energy peak associated with a multipath component that may be associated with the fat finger. Adjusting of the fat finger timing may be triggered by accumulating the difference signal, for example in accumulator 610, and comparing the accumulated difference signal to one or more thresholds, for example in comparator 612. The fat finger timing may be adjusted, for example through finger timing control 614, by adjusting timing of the plurality of channel taps in steps of an arbitrary portion of Tc, where the channel taps remain spaced contiguously at chip period intervals, as illustrated in FIG. 6 and FIG. 4. The fat finger timing may be adjusted adaptively, for example via the finger timing control 614. The difference signal may be determined by subtracting the one or more late energies from the one or more early energies, as illustrated in FIG. 5. One or more path processing blocks may be computing the early energies and the late energies, wherein the one or more path processing blocks are operable to exploit transmit diversity. The communication signals may conform with a Universal Mobile Telecommunications System (UMTS) signal.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for a method and system for a delay-locked loop for closely spaced multipath.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   determining a difference signal computed from one or more early energies and one or more late energies associated with one or more channel taps selected from a plurality of channel taps; and
   adjusting a fat finger timing based on said difference signal, said fat finger comprising said plurality of channel taps that are spaced contiguously at chip period intervals.

2. The method according to claim 1, comprising determining said one or more early energies and said one or more late energies based on an offset of Tc/2 or 3Tc/8, where Tc denotes said chip period interval.

3. The method according to claim 2, wherein said offset is measured from an energy peak associated with a multipath component associated with said fat finger.

4. The method according to claim 1, comprising triggering said adjusting of said fat finger timing by accumulating said difference signal, and comparing said accumulated difference signal to one or more thresholds.

5. The method according to claim 1, comprising adjusting said fat finger timing by adjusting timing of said plurality of channel taps, where said channel taps remain spaced contiguously at chip period intervals.

6. The method according to claim 1, comprising adaptively adjusting said fat finger timing.

7. The method according to claim 1, comprising determining said difference signal by subtracting said one or more late energies from said one or more early energies.

8. The method according to claim 1, wherein said early energies and said late energies are computed in one or more path processing blocks.

9. The method according to claim 8, wherein said one or more path processing blocks are operable to exploit transmit diversity.

10. The method according to claim 1, wherein said communication signals conform with a Universal Mobile Telecommunications System (UMTS) signal.

11. A system for processing communication signals, the system comprising:
one or more circuits operable to, at least:
determine a difference signal computed from one or more early energies and one or more late energies associated with one or more channel taps selected from a plurality of channel taps; and
adjust a fat finger timing based on said difference signal, said fat finger comprising said plurality of channel taps that are spaced contiguously at chip period intervals.

12. The system according to claim 11, wherein said one or more circuits are operable to determine said one or more early energies and said one or more late energies based on an offset of $T_c/2$ or $3T_c/8$, where $T_c$ denotes said chip period interval.

13. The system according to claim 11, wherein said one or more circuits are operable to measure said offset from an energy peak associated with a multipath component associated with said fat finger.

14. The system according to claim 11, wherein said one or more circuits are operable to trigger said adjusting of said fat finger timing by accumulating said difference signal, and to compare said accumulated difference signal to one or more thresholds.

15. The system according to claim 11, wherein said one or more circuits are operable to adjust said fat finger timing by adjusting timing of said plurality of channel taps, wherein said channel taps remain spaced contiguously at chip period intervals.

16. The system according to claim 11, wherein said one or more circuits are operable to adaptively adjust said fat finger timing.

17. The system according to claim 11, wherein said one or more circuits are operable to determine said difference signal by subtracting said one or more late energies from said one or more early energies.

18. The system according to claim 11, wherein said one or more circuits are operable to compute said one or more early energies and said one or more late energies in one or more path processing blocks.

19. The system according to claim 18, wherein said one or more path processing blocks are operable to exploit transmit diversity.

20. The system according to claim 11, wherein said communication signals conform with a Universal Mobile Telecommunications System (UMTS) signal.

* * * * *

UNITED STATES PATENT AND TRADEMARK OFFICE
CERTIFICATE OF CORRECTION

| | | Page 1 of 1 |
|---|---|---|
| PATENT NO. | : 8,331,421 B2 | |
| APPLICATION NO. | : 12/543283 | |
| DATED | : December 11, 2012 | |
| INVENTOR(S) | : Kong et al. | |

It is certified that error appears in the above-identified patent and that said Letters Patent is hereby corrected as shown below:

In the Specification

Column 10
Lines 21-22, please begin a new paragraph at "While the present invention has been described....".

In the Claims

Column 10
Lines 65-66, Claim 8, please replace "wherein said early energies" with --wherein said one or more early energies--.

Column 10
Line 66, Claim 8, please replace "said late energies" with --said one or more late energies--.

Signed and Sealed this
Twenty-third Day of July, 2013

Teresa Stanek Rea
*Acting Director of the United States Patent and Trademark Office*